Patented Mar. 7, 1933                                                                 1,900,276

UNITED STATES PATENT OFFICE

GERALD H. COLEMAN, OF MIDLAND, MICHIGAN, ASSIGNOR TO THE DOW CHEMICAL COMPANY, OF MIDLAND, MICHIGAN, A CORPORATION OF MICHIGAN

PROCESS FOR THE PREPARATION OF ETHYLIDENE CHLORIDE

No Drawing.    Application filed July 27, 1928.   Serial No. 295,853.

While the preparation of symmetrical dichlorethane, or ethylene dichloride, is readily carried out by well known methods, no successful commercial method for the direct synthesis of the isomeric unsymmetrical ethylidene chloride has heretofore been developed. The usual methods employed, for example by the chlorination of ethyl chloride or by the action of phosphorus pentachloride on acetaldehyde, have led to the production of a complicated mixture of chlorinated products from which the ethylidene chloride could be separated only with great difficulty and in low yield. Consequently the latter compound has remained too rare and costly to be used in commercial processes. Since, however, it can serve as the starting material for the synthetic preparation of other valuable organic compounds, a method whereby ethylidene chloride may be prepared in better yield and at lower cost is greatly to be desired.

I have found that the aforesaid compound can be directly prepared by reacting between vinyl chloride and hydrochloric acid in the presence of anhydrous aluminum chloride as catalyst, thus affording a relatively cheap and easy method of manufacture. To the accomplishment of the foregoing and related ends the invention, then, consists of the steps hereinafter fully described and particularly pointed out in the claims, the following description setting forth one preferred mode of procedure whereby the principle of the invention may be employed.

Vinyl chloride is readily prepared by passing the vapors of ethylene dichloride through a hot iron tube at a temperature approximately within the range of 400° to 500° C., decomposition of the latter taking place according to the equation:

$$CH_2Cl \cdot CH_2Cl \rightarrow CH_2:CHCl + HCl \quad (1)$$

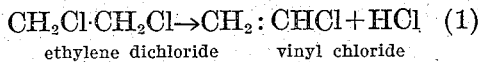

The iron tube is believed to catalyze this reaction. Other catalysts, notably aluminum oxide, are also effective, and with the last-mentioned the decomposition proceeds smoothly at about 375° C. If the products of such reaction, or if vinyl chloride and hydrochloric acid from separate sources, are then passed in the form of vapor through a body of anhydrous aluminum chloride catalyst at a temperature between 25° and 150° C., preferably about 125° C., recombination occurs, but in transposed relation to the original molecular formation, so that both Cl atoms now are attached to the same C atom, thus:

$$CH_2:CHCl + HCl \rightarrow CH_3 \cdot CHCl_2 \quad (2)$$

ethylidene chloride being formed in preference to ethylene dichloride.

By way of illustration, one mode of carrying out my improved method is described, but I do not limit myself thereto, as it will be evident that various modifications may be made in the steps as described without departing from the principle of my invention.

The mixed gases, or vapors, of vinyl chloride and hydrochloric acid obtained by the thermal decomposition of ethylene dichloride as aforesaid, or from other sources, in approximately equimolecular proportion, are dried, if necessary, by treatment with phosphorus pentoxide, concentrated sulphuric or other suitable drying agent, and then passed through a tube containing the anhydrous aluminum chloride catalyst, the temperature of the catalyst tube being maintained in the neighborhood of 125° C. The resultant reaction is exothermic, producing heat, and suitable means for either cooling or heating the catalyst body, as required in order to maintain the proper reaction temperature, should be provided. The percentage of conversion will vary from about 20 to 40 per cent. at a single passage, depending upon the velocity, temperature variations, degree of mixing and other factors. The reacted gases are then passed to a condenser where the ethylidene chloride is condensed out and separated, and the residual gases returned to the reaction. The crude product obtained has a boiling point between 50° and 60° C., due to solution of some unreacted vinyl chloride therein. Pure ethylidene chloride, B.P. 58° to 60°, is obtained by simple fractionation. Practically no trace of ethylene dichloride, B.P. 82° to 84° C., is found in the reaction product.

Obviously the reactions disclosed herein permit of establishing a process for the direct production of ethylidene chloride from ethylene dichloride, which has not heretofore been commercially practicable by any of the known methods. Inasmuch as ethylene dichloride is now produced in large quantity and is available at a relatively low price, my improved process for the first time makes the manufacture of ethylidene chloride possible at a cost which renders it suitable as a raw material for other commercial processes.

My complete process, therefore, includes within its scope the continuous production of ethylidene chloride by means of the following steps, or modifications thereof, viz:

(1) Ethylene dichloride is decomposed according to Equation (1), by passing the vapors thereof through a hot iron tube, with or without a catalyst, at a temperature between 350° and 500° C.;

(2) The gaseous products from the first step, viz. vinyl chloride and hydrochloric acid, together with undecomposed ethylene dichloride, are cooled to a temperature below the boiling point of the latter, e. g., 82° to 84° C., such temperature being conveniently between 0° and 50° C., and the condensed ethylene dichloride separated and returned to the first step;

(3) The residual gaseous mixture of vinyl chloride and hydrochloric acid from step 2 is then passed through a reaction tube containing anhydrous aluminum chloride catalyst at a temperature between 25° and 150° C.;

(4) The mixed gases from step 3 are cooled to a suitable temperature below 50° C. to condense the ethylidene chloride, which is separated, and the residual gases returned to step 3;

(5) The condensate from step 4 is fractionated to separate dissolved vinyl chloride and pure ethylidene chloride, the former being returned to step 3, and the latter, as the desired product, is drawn off for use or to storage.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. In a process of making ethylidene chloride, the step which consists in reacting between vinyl chloride and hydrochloric acid in the presence of anhydrous aluminum chloride as catalyst.

2. A process of making ethylidene chloride, which comprises thermally decomposing the vapors of ethylene dichloride and leading the gaseous mixture of vinyl chloride and hydrochloric acid thereby obtained into contact with a catalyst comprising aluminum chloride whereby said acid is added to the vinyl chloride to form ethylidene chloride.

3. In a process of making ethylidene chloride, the step which consists in heating a gaseous mixture of vinyl chloride and hydrochloric acid at a temperature between 25° and 150° C. in the presence of anhydrous aluminum chloride as catalyst.

4. In a process of making ethylidene chloride, the step which consists in heating a gaseous mixture of vinyl chloride and hydrochloric acid at a temperature of about 125° C. in the presence of anhydrous aluminum chloride as catalyst.

5. In a process of making ethylidene chloride, the steps which consist in heating a gaseous mixture of vinyl chloride and hydrochloric acid at a temperature between 25° and 150° C. in the presence of anhydrous aluminum chloride as catalyst, separating ethylidene chloride from the unreacted residual gases, and returning the latter to the process.

6. In a process of making ethylidene chloride, the steps which consist in heating a gaseous mixture of vinyl chloride and hydrochloric acid at a temperature of about 125° C. in the presence of anhydrous aluminum chloride as catalyst, separating ethylidene chloride from the unreacted residual gases, and returning the latter to the process.

7. The process of making ethylidene chloride which comprises decomposing the vapors of ethylene dichloride at a temperature between 350° and 500° C. and leading the gaseous mixture of vinyl chloride and hydrochloric acid obtained thereby into contact with anhydrous aluminum chloride as catalyst at a temperature between 25° and 150° C.

8. The process of making ethylidene chloride which comprises decomposing the vapors of ethylene dichloride at a temperature between 350° and 500° C. in the presence of a catalyst, and leading the gaseous mixture of vinyl chloride and hydrochloric acid obtained thereby into contact with anhydrous aluminum chloride as catalyst at a temperature between 25° and 150° C.

9. The process of making ethylidene chloride which comprises decomposing the vapors of ethylene dichloride at a temperature between 350° and 500° C., separating the gaseous mixture of vinyl chloride and hydrochloric acid thereby formed from undecomposed ethylene dichloride, leading said mixture into contact with anhydrous aluminum chloride as catalyst at a temperature between 25° and 150° C., condensing and separating the ethylidene chloride so obtained from the unreacted gases, and returning the latter to the process.

Signed by me this 21st day of July, 1928.

GERALD H. COLEMAN.